May 23, 1933.   L. H. MORIN   1,910,559
JUICE EXTRACTOR
Filed Sept. 10, 1931   2 Sheets-Sheet 1
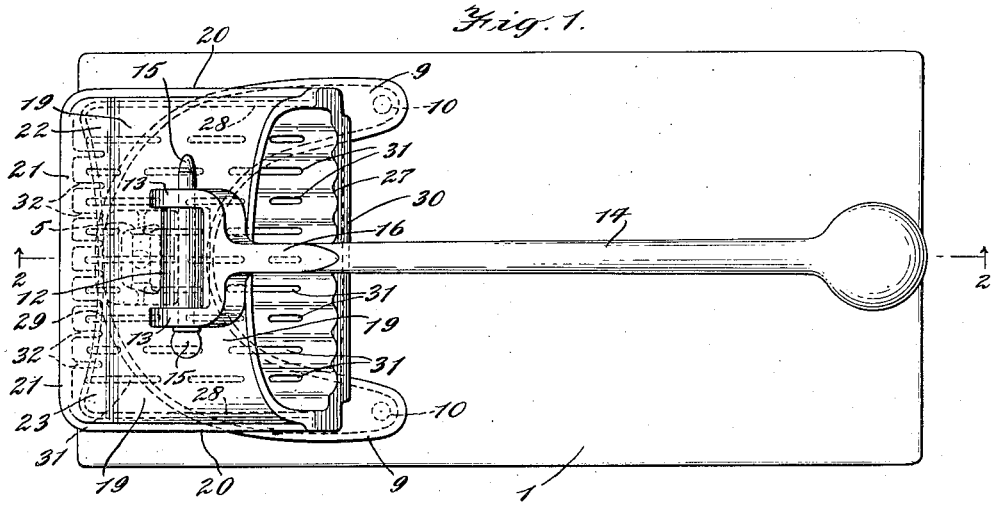
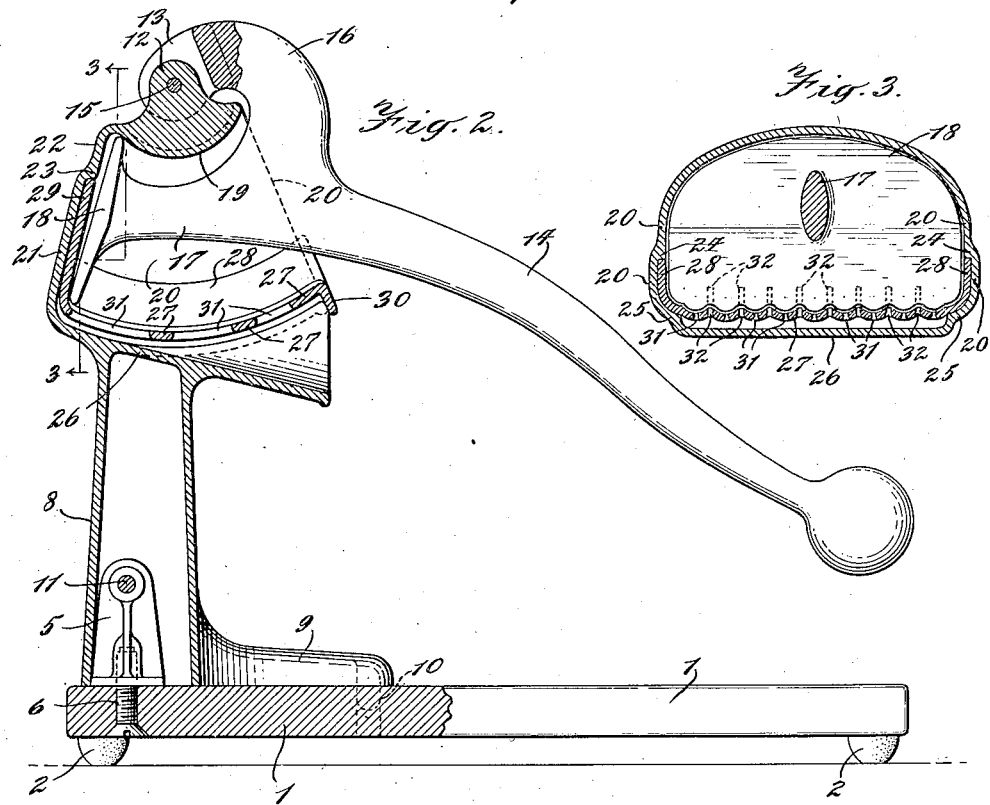
INVENTOR
Louis H. Morin
BY
Victor D. Borst
ATTORNEY

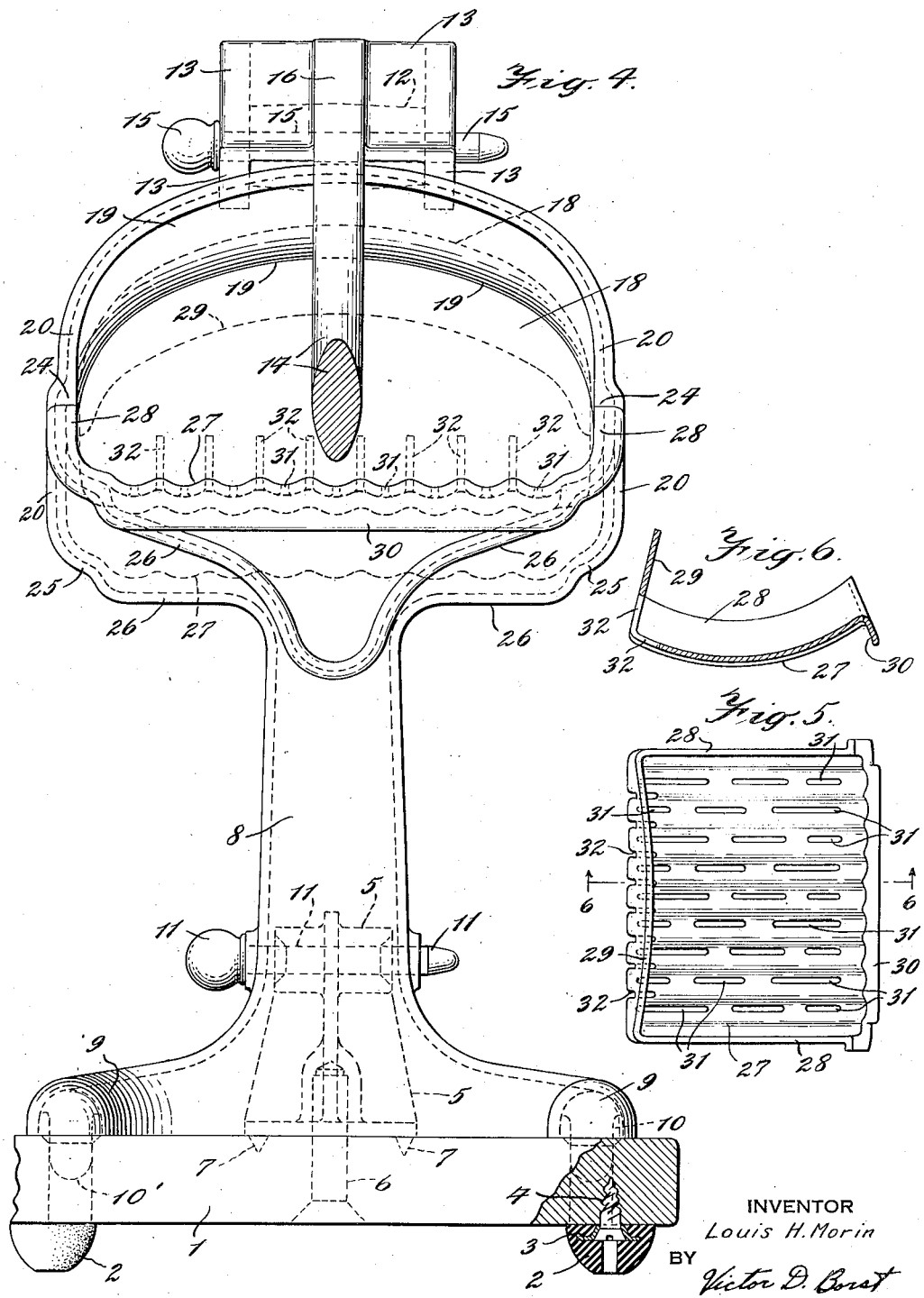

Patented May 23, 1933

1,910,559

UNITED STATES PATENT OFFICE

LOUIS H. MORIN, OF NEW YORK, N. Y., ASSIGNOR TO DOEHLER DIE-CASTING CO., A CORPORATION OF NEW YORK

JUICE EXTRACTOR

Application filed September 10, 1931. Serial No. 562,000.

This invention relates to that type of juice-extracting press in which an imperforate abutment wall is opposed to an imperforate plunger which moves along over a slotted or otherwise perforated strainer plate which may form a lower wall and through which the pressed out juice may flow. Juice-extracting presses of this kind have been found to be particularly advantageous for use in pressing out the juice of citrus fruits, such as oranges and the like. In such case the fruit is cut in half and a fruit half is then placed in the extracting device with its cut side resting against the strainer plate. Then when the plunger is operated it folds and collapses the skin of the fruit upon itself thereby pressing out the juice in a particularly effective manner. The present invention operates in accordance with this well known general principle.

Among the objects of the invention is, not only to provide a juice extractor which is more than commonly effective for the purpose above noted, but which also is equally well adapted and highly effective for various other uses, such as for extracting the juice from grapes or the like. Another object of the invention is to provide a juice-extracting device of a knockdown construction which may be easily and quickly disassembled into a plurality of separate major sectional parts or pieces so as to occupy only a small storage space when not in use and which may be just as easily reassembled when the device is desired for use. Another object of the invention is to construct the device in such a manner that all of the larger or principal parts thereof may be die-cast, with the possible exception of a base plate, which may be of wood but which also could be a suitable die-casting if so desired. Other objects of the invention are convenience of use, including the cleaning of the device, as well as also in operating it for extracting juice. Other more general objects of the invention are convenience and economy in manufacture, strength, durability, and reliability. Yet other objects and advantages of the invention will hereinafter appear.

In carrying out the invention in a practical manner, the juice extractor is made up of three major readily detachable and separable sections, comprising a base plate, a main frame part including a body upstanding from the base plate and rigidly but detachably mounted thereon, and a plunger-carrying operating lever which is detachably pivoted on such frame part to be readily removed therefrom together with its plunger.

As another feature of the invention, a conveniently removable strainer plate is provided to form a bottom for the casing body within which the material is to be compressed by the rearwardly moving plunger against a rear abutment wall, this casing body being open at the front and the strainer plate being mounted so as to be slid out and removed at this open front end. Another feature of the invention resides in the fact that this bottom-forming strainer plate and also an upper or top wall of the open-front casing body are arcuately curved from front to rear in concentric relation about an axis above the top plate and which forms the pivotal axis of the plunger-carrying lever, the pressing plunger itself being of sufficient area and shaped so as to have a close sliding fit with both of these concentric walls, as well as also with side walls of this casing body, so that thereby small fruit or other material, including not only grapes but also various kinds of berries and the like, may have their juice effectively extracted.

As another feature of the invention, this slidably removable strainer plate is corrugated transversely of its width so that these corrugations form alternately ridges and depressions running in parallel relation longitudinally from the front end to the rear end of this strainer plate, openings for the escape of the extracted juice being provided through the strainer plate in the depressions between the ridges. A further feature in connection with this corrugated strainer plate is that the lower edge of the pressing plunger is also similarly corrugated in a manner complementary to the corrugations of the strainer plate and having close sliding interfitting relation therewith. The invention also further comprehends various other features and combinations of parts, as will appear from the following description.

One embodiment of the invention is illustrated in the accompanying drawings and will now be described, the invention thereafter being pointed out in claims, reference now being had to the drawings, in which:

Fig. 1 is a plan view of a juice extractor constituting an embodiment of the invention, with some of the otherwise concealed features shown by dotted lines;

Fig. 2 is a vertical section of the juice extractor taken on the horizontal line 2—2 of Fig. 1, with some parts appearing in elevation;

Fig. 3 is a substantially vertical section taken on the zigzag line 3—3 of Fig. 2;

Fig. 4 is an enlarged front elevation of the juice extractor, with a few parts in vertical section;

Fig. 5 is a plan view, drawn to the scale of Figs. 1, 2 and 3, showing the strainer plate pan or tray in its removed condition; and Fig. 6 is a front to rear vertical section of this strainer plate taken on the horizontal line 6—6 of Fig. 5.

The following particular description of the embodiment of the invention shown in the accompanying drawings is to be construed as comprising within its intended meaning the provision for making various changes and variations in the particular construction which is described and as coming within the scope of the invention as defined in the claims. The particular embodiment of the invention shown in the drawings has a strong and rigid flat elongated rectangular base plate 1 which can be made from any suitable material and could be of cast metal, but which in the particular embodiment of the invention shown in the drawings is of suitable strong hard wood, such as maple, thus forming a baseboard, as is indicated in the drawings. Each corner of this baseboard is shown as provided on its lower side with a supporting foot comprising a molded rubber button 2 having a washer 3 embedded therein and secured to the baseboard by means of a screw 4.

On its upper side adjacent one of its ends and on its longitudinal center line the baseboard 1 rigidly carries an upstanding cast metal bracket 5 which is firmly secured to the baseboard by means of a screw 6 passing upwardly through the baseboard and screwed into a screw-threaded socket formed in the lower side or bottom of the bracket 5, this screw 6 having a flat head countersunk flush into the lower side of the baseboard 1. The otherwise flat lower side of the upstanding bracket 5 is provided laterally thereof with a pair of downwardly projecting sharp prongs or teeth 7 which bite into the upper side of the baseboard 1 to prevent rotative movement of the bracket 5. The baseboard 1, together with its attached bracket 5, constitutes one of the major separable sections of the assembled juice extractor, as will presently more clearly appear.

Another independently separable major section of the device is a one-piece cast metal main frame part which includes a body portion, to be hereinafter described, and a hollow post or tubular standard 8, the lower end of which is horizontally plane, to abut against the top of the baseboard 1 and to receive within it the upright bracket 5 in an eccentric position towards the adjacent end of the baseboard 1, as shown more clearly in Fig. 2. For convenience of description, as well as other good reasons which will hereinafter appear, the left hand end of the completed device, as viewed in Figs. 1 and 2, will hereinafter be referred to as the rear, while the other or right hand end will be designated as the front of the machine. The lower end portion of the tubular standard 8 is flanged laterally outward and forwardly in a substantially crescent shape, thereby to provide a pair of laterally spaced forwardly projecting braces 9, which may be hollowed out on their lower sides as indicated and the lower sides of which lie in the same plane as the lower end of the standard 8 and thus lie upon the upper side of the baseboard 1, as shown most clearly in Figs. 2 and 4.

The ends of the braces 9 formed by these projecting base flanges are each provided with a downwardly projecting stud 10, which may be cast in the same piece therewith, as indicated in the drawings. These lugs or studs 10 enter sockets or holes in the upper side of the baseboard 1 and thus prevent rotative movement of the standard 8 about a vertical axis relatively to the baseboard 1. The main frame piece, which includes the body of the device, is firmly and rigidly but detachably connected with the baseboard 1 by means of a horizontal coupling pin 11 which passes transversely entirely through the tubular standard 1 and at the same time through the upper end portion of the upstanding anchor bracket 5.

This coupling pin 11 is shown (Fig. 4) as shouldered and provided with a rounded projecting head at one of its ends, while its other end is provided with a tapering portion, whereby this coupling pin 11 may be readily pushed into place for securing the standard 8 to the baseboard 1, or may be easily withdrawn for thereby disconnecting the standard and baseboard from one another. It will be evident that the studs 10 are of material assistance in bringing the holes for the coupling pin 11 into alignment in effecting the assembly as above described. In this assembled relation it will now evident that when the standard 8 is thus anchored to the bracket 5 by the removable coupling pin 11, then the standard 8 and the body thereon will be strongly and rigidly supported on the baseboard 1, and particularly its forward tilting movement will be prevented, by reason of the laterally spaced forwardly projecting braces 9.

At its extreme upper end in spaced relation above and substantially in line with the supporting standard 8 the main frame piece is provided with an upwardly projecting transversely elongated rounded pivot lug 12 which has a horizontal bore or hole longitudinally through it. This pivot lug 12 is embraced at its ends by a yoke 13 which forms a bifurcation on the adjacent pivot end of a handle lever 14. This yoke 13 is detachably pivoted to the lug 12 by means of a removable pivot pin 15 which passes freely through both arms of this yoke and through the interposed lug 12. This pivot pin at one of its ends is provided with a projecting shoulder-forming head while its other projecting end is tapered, whereby this pin may be conveniently and quickly removed or inserted, it being noted that this pin 15 forms both a pivot pin and a coupling pin.

The operating lever or handle 14 normally projects in general towards the front and may swing in a vertical plane over the forward end portion of the baseboard 1. The lever 14 has a short gooseneck portion 16 which terminates in the pivot yoke 13, and at the base of this gooseneck has a rearwardly extending branch arm or stem 17 which terminates at its rear end in a piston head or plunger 18, which has a flat rear face which is disposed in a plane parallel to the axis of the pivot pin 15, with this plane of the plunger face passing to the rear of such axis. It will be noted that the handle lever 14, together with the above described parts carried thereby and shown as formed integral therewith in a single casting, constitute a third detachable or separable major sectional part of the complete machine.

A body per se in the form of an open-front casing or chamber is formed as a part in the same piece with and interposed between the upper end of the supporting standard 8 and the pivot lug 12 at the top. This casing chamber or receptacle has a top wall 19 which is relatively short from front to rear and which from front to rear is rather sharply arcuately convexly curved concentrically with the axis of the pivot pin 12, beneath which this wall is located and from the center of the concave part or upper side of which the pivot lug 12 rises, the convex side of this wall being its lower or inner side, and it may be noted that the walls of this casing body will be described with more particular reference to their shape or contour at the inside of this casing body. This top wall 19 is shown as slightly concave transversely or in planes radial to the axis of the pivot pin 1 and as gradually merging along a somewhat sharper curve downward into parallel side walls 20. These side walls 20 at the rear are connected together by a flat end wall 21 which is disposed in a plane parallel with the axis of the pivot pin 15 and lying in a plane passing to the rear of this axis at a somewhat greater angle to a radial plane than the rear face of the plunger 18, as above described. The upper portion 22 of this rear wall 21 is offset inwardly or forwardly, thereby to form an inner downwardly facing shoulder at 23.

The side walls 20 are offset outwardly at 24, thereby to provide downwardly facing guide shoulders at the inside, and the extreme lower portions of these side walls are turned inwardly on a curve to form other upwardly facing guide shoulders at 25. A lowermost bottom wall 26 integrally connects together the shoulder-forming portions 25 of the side walls 20 and at the rear is integrally joined with the rear wall 21, from which this bottom wall 26 extends forwardly on a slight downward inclination and as it passes forwardly gradually merges into a front spout, the transverse shape of which is shown in Fig. 4, the front spout-forming end of this bottom wall 26 terminating in a vertical transverse plane, as appears in Fig. 2. Both the upper and the lower guide shoulders 24 and 25 have an arcuate curve about the pivot pin 15 and concentric with the curvature of the inner side of the upper wall 19, for a purpose which will presently appear. The front edges of the side walls 20 are straight and incline upwardly and rearwardly from the front edge of the bottom 26 to the front edge of the shorter top wall 19. The upper end of the tubular standard 8 is integrally joined with this bottom wall 26 of the casing towards the rear thereof, with the spout-forming front portion of this bottom wall 26 projecting forwardly for some distance away from the standard 8.

A readily removable strainer plate 27 forms an inner bottom wall for the casing in spaced relation above its lowermost bottom wall 26. This strainer plate is in the form of a tray or pan having upright side walls 28 forming rounded corners therewith and having a flat rear wall 29 which extends upwardly above the side walls 28 on a gradually rounded curve along its edge, as indicated in dotted lines in Fig. 4. This strainer plate 27 is in general of rectilinear shape transversely or from side to side between its upstanding side walls 28, but together with its side walls 28 is shaped to have an arcuate concave curve from front to rear with respect to its upper or inner side. The upper and lower inner guide shoulders 24 and 25 have a curvature from front to rear which is complementary to that of the strainer plate 27 and its side walls 28, this curvature being about the axis of the pivot pin 15 as a center and being concentric with the inner front-to-rear convex arcuate curvature of the upper wall 19.

The arcuate side walls 28 of the strainer plate 27 are freely slidable between the lower portions of the side walls 20, being guided above and below by the shoulders 24 and 25 respectively, the inner faces of these side walls 28 being flush with the inner faces of the side walls 20 above the shoulders 24. The inner shoulder 23 formed between the lower and upper portions 21 and 22 of the rear wall of the casing body is of a contour complementary to that of the upper edge of the rear wall 29 of the strainer, so that thereby this rear wall 29 may abut flatly against the lower rear wall portion 21 of the casing body with the inner or front face of this strainer wall 29 flush with the inner face of the upper portion 22 of the rear wall of the casing body. The strainer plate 27 at its front end is provided with a right angular downwardly projecting flange 30 which provides a convenient finger hold for withdrawing and removing this strainer plate in order that it may be more effectively cleaned.

The pressing plunger 18 is shaped to have a rather close but at the same time free sliding fit within the above described open front casing body, this plunger 18 being shaped to follow the inner contour of the walls 19, 20, 27 and 28 as is most clearly shown in Fig. 3. The strainer plate 27 is provided throughout its width with a transverse series of corrugations which extend smoothly and continuously from the front to the rear end of this plate and which thus form transversely of this plate alternating ridges and intervening depressions. The lower edge of the plunger 18 is similarly corrugated complementary to the corrugations of the strainer plate 27, so that thereby the corrugations of the plunger have an interfitting relation with the corrugations of the strainer plate, as shown in Fig. 3.

The strainer plate 27 has through it a series of longitudinally slotted strainer openings 31 extending along the middle line of each of the depressions formed between the ridges of the corrugations. The number of such slots 31 in each such series is shown as three, although this number may be varied. These successive longitudinally aligned slots 31 are shown as of different lengths and as differently arranged in each such series in such a manner that the slots in any one such series break joints with or are disposed in relatively overlapping relation with the slots of the adjacent series in alternating relation transversely of the strainer plate. The front ends of all of the front slots terminate even with one another along a line adjacent to the front end of the strainer plate, while the rear ends of the rear slots similarly terminate along a line more closely adjacent, although to a small extent spaced forwardly from, the flat upright rear wall 29 of this strainer plate.

In addition to these strainer slots 31, elbow-shaped slots 32 are formed in the rear lower corner portion of the tray or pan formed by the strainer plate, each of these slots 32 having an upwardly extending portion in the rear wall 29. All of these slots 32 terminate at their upper ends on a horizontal line substantially at the level of the upper edges of the adjacent rear portions of the strainer plate side walls 28. The lower portions of these angular slots 32 extend forward for a short distance into the bottom wall formed by the strainer plate 27. These corner slots 32 are disposed transversely in alternating relation with the adjacent longitudinal slots 31, and thus the forwardly extending portions of these slots 32 extend between and in relatively overlapping relation with the adjacent end portions of the longitudinal bottom slots 31, so that therefore the forwardly extending end portions of these slots 32 are in the tops or crests of the ridges formed by the corrugations in the strainer plate 27.

These angular corner slots 32 supplement the longitudinal slots 31 in providing at this point further freedom for the escape of the pressed out juice. It will be noted in this connection that the upright portions of these corner slots 32 in the rear wall 29 of the strainer plate will be closed at the back thereof by reason of this rear wall 29 abutting, as shown in Fig. 2, flatly against the inner face of the rear wall 21 of the casing chamber, but these slots 32 are open throughout at their lower end portions and accordingly may freely drain downwardly.

In the fully inserted position of the plunger 18 into the above described empty casing chamber, as shown in Fig. 2, it will be noted that the lower edge of the plunger 18 comes into contact with the lower portion of the rear wall 29 of the strainer plate, while the upper edge portion of the front face of this plunger is shown as being slightly spaced forwardly from the adjacent inner face of the upper portion 22 of the rear casing wall. It will be understood, however, that when fruit or other material which has been compressed is interposed between the plunger 18 and the opposed abutment wall therefor, which is formed in part by the inner face of the upper rear wall portion 22 of the casing and in part by the inner face of the rear wall 29 of the strainer plate, then the different angular position of the plunger 18 will bring it more nearly into parallelism with this two-part rear abutment wall of the casing. However, it has been found desirable to provide, as indicated, a slightly greater spacing at the top of the casing chamber, between its rear abutment wall and the plunger 18, in the final operated position of the latter, by reason of the fact that when a fruit half, such as that of an orange, is placed on the strainer plate 27 with its raw or cut side downward, the folding together of the skin of this fruit half when it is collapsed together by the advancing plunger will require slightly more space at the top by reason of the fold in the fruit skin.

It is believed that the construction of the embodiment of the invention shown in the drawings has now been fully described and that but little remains to be said as to its manner of operation, which appears to be obvious. By merely withdrawing the pivot pin 15 and the anchor pin 11, the assembled device becomes separated into three major sections which may be conveniently and quickly reassembled into the complete machine. This not only provides for shipment and storage in smaller packages, but for the user, it enables the three separate pieces of the device to be tucked away, either together or separately, so as to occupy but little space in a household cupboard closet or the like.

It is obvious that the pressing plunger 18 may be withdrawn from the open front of the pressing chamber or casing by swinging the handle 14 upwardly and towards the rear from the position thereof shown in Figs. 1 and 2, and this handle, if desired, may be thus swung over rearwardly to the rear of its pivot pin 15 to a rearmost position in which the yoke 13, in which the gooseneck portion 16 terminates, comes into engagement with the upper side of the rear portion of the top wall 19 of the casing, so as then to be maintained in this position by gravity. With the pressing plunger 18 out of the casing chamber and swung upwardly sufficiently to be out of the way, any substance or material whose juice is to be pressed out may be laid in the chamber to rest upon the strainer plate 27. In the case of fruit such as oranges, grapefruit and the like, which have rather thick and tough skins, a cut half of such fruit is placed on the strainer plate 27 with its cut side down. Then, when the handle 14 is brought down, the plunger 18 will compress and collapse this fruit half, effectively pressing out its juice which will flow through the slots 31 of the strainer plate, and in the final portion of the compression particularly, will also flow out through the rear corner slots 32 and will drop upon the lowermost bottom wall 26 of the casing, from which it will flow forwardly out through the front spout.

In the case of fruits or the like of small size, such as berries, currants, or grapes, for example, the juice also will be effectively pressed out by reason of the fact, as above noted, that the plunger 18 has a close sliding fit in the casing, including its upper removable bottom wall formed by the corrugated strainer plate 27, so that thereby the material being pressed cannot escape around the plunger. The skins and pulp remain in the pan formed by the strainer plate, which may be withdrawn at the open front of the casing for emptying and further cleaning, if desired. The pressed out juice may be caught in a glass or other suitable receptacle resting on the baseboard 1 between the ends of the braces 9 and beneath the spout provided by the bottom 26 of the casing body.

It is obvious that various modifications may be made in the construction shown in the drawings and above particularly described, within the principle and scope of the invention as defined in the appended claims.

I claim:

1. In a juice extractor, a strainer in the form of a pan comprising a concave arcuately curved bottom having upright side walls and one end wall only with its other end open, the said concave bottom being corrugated to form continuous ridges extending longitudinally from adjacent the said open end to a point adjacent the said rear wall and having through it a series of longitudinally slotted strainer openings extending along the bottom of the depression formed between each pair of the said ridges, the said pan being provided in its lower rear corner with a transverse series of elbow-shaped strainer slots extending vertically downward in the lower portion of the said rear wall and continuing forward into the rear portion of the said bottom into the crests of the said ridges and in intervening relation with the rear end portions of the rearmost slots belonging to the said series of slots through the bottom.

2. In a juice extractor, the combination of a frame having a casing body formed therein, the casing body being open at the front and having a rear wall and side walls and a top wall which is interiorly convexly arcuately curved from front to rear about a horizontal transverse axis on the frame above said top wall, a strainer plate in the form of a tray which forms a removable bottom wall for the said casing body extending from the open front end of the latter to its rear wall and slidably mounted between the lower portions of the said side walls so as to be slid out forwardly at the open front of the casing, this bottom wall formed by the strainer plate being concavely arcuately curved from front to rear about the said axis concentrically with the said top wall, a handle lever pivoted on the frame to rock about the said axis, and a plunger rigidly carried by the handle lever and shaped to have a close sliding fit in the said casing body relatively to its said top and bottom and side walls.

3. The invention defined in claim 2, in combination with a lowermost bottom wall for the said casing body rigid therewith in spaced relation below the removable bottom wall formed by said strainer plate, this lowermost bottom wall being inclined downwardly and forwardly from the said rear wall to the open front of the casing and shaped there to form a spout, and a supporting standard forming a part of the said frame and having a rigid connection at its upper end to the said lowermost bottom wall in spaced relation at the rear of the said front spout formed thereby.

4. The invention defined in claim 2, in which the said strainer plate is transversely corrugated throughout its width with the said corrugations extending continuously throughout its length from its front and to its rear end, strainer openings being provided through said plate along the bottom of the depressions between the ridges formed by the said corrugations and the lower edge of the said plunger being provided with corrugations complementary to those of the strainer plate and having an interfitting relation therewith.

5. The invention defined in claim 2, in combination with upright parallel side walls formed on the said strainer plate and slidably countersunk into the lower portion of the said side walls of the casing flush therewith, and a rear wall formed on the said strainer plate extending between its side walls and countersunk into the lower portion of the said rear wall of the casing flush therewith so as to form therewith an abutment wall which is opposed to the said plunger.

6. The invention defined in claim 2, in combination with upright parallel side walls formed on the said strainer plate and slidably countersunk into the lower portion of the said side walls of the casing flush therewith, and a rear wall formed on the said strainer plate extending between its side walls and countersunk into the lower portion of the said rear wall of the casing flush therewith so as to form therewith an abutment wall which is opposed to the said plunger, the said rear wall of the strainer plate being provided in its lower portion with a transverse series of vertical slots which extend downwardly and are continued forwardly into the bottom portion of this strainer plate, the portion of said slots in the rear wall of the strainer plate being closed at the back by the said rear wall of the casing but being open downwardly at their lower ends.

7. The invention defined in claim 2, in combination with upright parallel side walls formed on the said strainer plate and slidably countersunk into the lower portion of the said side walls of the casing flush therewith, and a rear wall formed on the said strainer plate extending between its side walls and countersunk into the lower portion of the said rear wall of the casing flush therewith so as to form therewith an abutment wall which is opposed to the said plunger, the said rear wall of the strainer plate being provided in its lower portion with a transverse series of vertical slots which extend downwardly and are continued forwardly into the bottom portion of this strainer plate, the portion of said slots in the rear wall of the strainer plate being closed at the back by the said rear wall of the casing but being open downwardly at their lower ends, the said casing body bottom formed by the strainer plate having through it longitudinal slots which at their rear ends extend between the forwardly extending portions of the said slots which extend into the rear wall of this strainer plate.

8. In a juice extractor having a frame and a handle lever projecting therefrom and pivoted thereon on a horizontal axis for movement in a vertical plane to operate the extractor, a supporting leg rigidly carrying the said frame, an upwardly projecting immovably mounted anchor bracket, and means for rigidly detachably connecting the lower end portion of said leg to the anchor bracket.

9. In a juice extractor having a frame and a handle lever projecting therefrom and pivoted thereon on a horizontal axis for movement in a vertical plane to operate the extractor, a supporting leg rigidly carrying the said frame, an upwardly projecting immovably mounted anchor bracket, and means for rigidly detachably connecting the lower end portion of said leg to the anchor bracket, the said leg being in the form of a hollow standard and the said upstanding anchor bracket being received into the lower end thereof, and the said detachable connecting means comprising a removable pin passing horizontally transversely through the said hollow leg and the said upstanding anchor bracket.

10. In a juice extractor having a body and a handle lever pivoted thereon to be swung downwardly in the extracting operation, a base plate extending horizontally beneath the said body and lever, a support for the said body rigidly connected thereto and having widely spaced points of contact with the said base piece along the direction in which the said lever extends, an upstanding anchor bracket carried by the said base plate adjacent one end thereof, and means for detachably connecting the said support to the anchor bracket at a point on the said support adjacent to a point of contact of such support with said base plate which is spaced away from its other said points of contact in a direction removed from the free end of the said handle lever, said means comprising a transversely removable coupling pin to permit the said lever-carrying body to be detached from the said bracket-carrying base piece.

11. In a juice extractor having a body part and a handle lever pivoted thereon to be swung in a vertical plane in the extracting operation, a tubular standard rigidly connected to and extending down from the said body part and having an enlarged flanged base portion projecting horizontally in the same direction that the said lever swings, an elongated horizontal base plate above which the said lever may swing and upon one end portion of which the said standard may rest adjacent the said end with its said flange enlargement also resting on the said base plate below the said handle, an anchor bracket projecting upwardly from said base plate to be received into the lower end of the said standard, a screw headed beneath and passing upwardly through the said base plate into threaded engagement with the said bracket for firmly securing the latter on the base plate, and a removable coupling pin passing transversely through the standard and through the upper portion of the said bracket for thereby detachably connecting together the said handle-carrying body part and the said bracket-carrying base plate.

12. In a juice extractor, the combination of a body forming a casing having top, bottom and side walls and open at the front, the bottom wall being inclined downwardly and forwardly and being shaped in the form of a spout at the front end thereof, a strainer plate above the bottom wall mounted between the lower portions of the side walls so as to be slid out towards and removed through the open front end of the casing, and means for applying pressure in a front and rear direction parallel with the upper surface of the strainer plate to material resting thereon.

In witness whereof, I hereunto subscribe my signature.

LOUIS H. MORIN.